(12) United States Patent
Lang et al.

(10) Patent No.: US 10,436,913 B2
(45) Date of Patent: Oct. 8, 2019

(54) BALER INFORMATION SYSTEM AND METHOD

(71) Applicants: Deere & Company, Moline, IL (US); Iowa State University Research Foundation, Inc., Ames, IA (US)

(72) Inventors: Eric R. Lang, Newhall, IA (US); Walter M. Schlesser, Dubuque, IA (US); Jeffrey Askey, Boone, IA (US)

(73) Assignees: DEERE & COMPANY, Moline, IL (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 234 days.

(21) Appl. No.: 15/589,325

(22) Filed: May 8, 2017

(65) Prior Publication Data

US 2017/0354092 A1    Dec. 14, 2017

Related U.S. Application Data

(60) Provisional application No. 62/347,929, filed on Jun. 9, 2016.

(51) Int. Cl.
| | |
|---|---|
| *G01S 19/45* | (2010.01) |
| *A01F 15/08* | (2006.01) |
| *A01F 15/00* | (2006.01) |
| *G01S 19/13* | (2010.01) |
| *G01S 19/25* | (2010.01) |

(Continued)

(52) U.S. Cl.
CPC ............. *G01S 19/45* (2013.01); *A01F 15/00* (2013.01); *A01F 15/08* (2013.01); *G01S 19/13* (2013.01); *G01S 19/24* (2013.01); *G01S 19/25* (2013.01); *G01S 19/42* (2013.01); *A01F 15/0875* (2013.01)

(58) Field of Classification Search
CPC .......... G01S 19/45; G01S 19/42; G01S 19/24; G01S 19/25; G01S 19/13; A01F 15/08; A01F 15/00; A01F 15/0875
See application file for complete search history.

(56) References Cited

U.S. PATENT DOCUMENTS 3,992,986 A * 11/1976 Sutton ..................... B30B 9/30
                                                    100/7
5,289,572 A    2/1994 Yano et al.
(Continued)

FOREIGN PATENT DOCUMENTS

| EP | 974259 A1 * | 1/2000 | ............. A01F 15/08 |
|---|---|---|---|
| EP | 1053673 | 11/2000 | |

(Continued)

OTHER PUBLICATIONS

EP17175323.9 Extended European Search Report dated Nov. 2, 2017 (6 pages).

*Primary Examiner* — Dale W Hilgendorf
(74) *Attorney, Agent, or Firm* — Michael Best & Friedrich LLP

(57) ABSTRACT

A bale information system includes a baling machine configured to process a material into a bale, the baling machine including a sensor configured to measure a release of the bale from the baling machine, a global positioning system receiver in operable communication with the baling machine, and a data storage system operable to receive and store data from the global positioning system receiver.

18 Claims, 7 Drawing Sheets

(51) Int. Cl.
*G01S 19/24* (2010.01)
*G01S 19/42* (2010.01)

(56) References Cited

U.S. PATENT DOCUMENTS

| | | |
|---|---|---|
| 5,682,525 A | 10/1997 | Bouve et al. |
| 5,913,801 A | 6/1999 | Bottinger et al. |
| 5,930,474 A | 7/1999 | Dunworth et al. |
| 7,401,547 B2* | 7/2008 | Degen ................ A01F 15/0875 701/50 |
| 7,415,924 B2 | 8/2008 | Roberts |
| 7,621,111 B2 | 11/2009 | Roberts |
| 8,452,496 B2 | 5/2013 | Foster et al. |
| 8,516,954 B2 | 8/2013 | Smith et al. |
| 8,531,300 B2 | 9/2013 | Foster et al. |
| 2007/0175341 A1 | 8/2007 | Roberts |
| 2009/0217827 A1 | 9/2009 | Duenwald et al. |
| 2010/0032498 A1 | 2/2010 | Kelly et al. |
| 2012/0072533 A1 | 3/2012 | O'Neil |
| 2014/0157999 A1 | 6/2014 | Verhaeghe et al. |
| 2014/0350752 A1* | 11/2014 | Gelinske et al. ........ G07C 5/00 701/2 |
| 2015/0379785 A1* | 12/2015 | Brown, Jr. et al. ..... A01F 15/08 701/29.1 |
| 2016/0014971 A1* | 1/2016 | Kraus ................. A01F 15/0875 701/50 |
| 2016/0308954 A1* | 10/2016 | Wilbur et al. .......... G06F 16/29 |
| 2017/0118918 A1* | 5/2017 | Chaney et al. .......... A01F 15/08 |
| 2017/0265400 A1* | 9/2017 | Retzlaff et al. ..... A01F 15/0875 |
| 2017/0332556 A1* | 11/2017 | Underhill ............ A01F 15/0883 |

FOREIGN PATENT DOCUMENTS

| | | |
|---|---|---|
| EP | 3001894 | 4/2016 |
| WO | 2014031355 | 2/2014 |
| WO | 2014137533 | 9/2014 |

\* cited by examiner

BALER INFORMATION SYSTEM AND METHOD

CROSS-REFERENCE TO RELATED APPLICATIONS

This application claims priority to U.S. Provisional Patent Application No. 62/347,929, filed on Jun. 9, 2016 and entitled "Baler Information System and Method," the contents of which is hereby incorporated by reference in its entirety.

BACKGROUND

The present disclosure relates to systems and methods for baling agricultural products, in particular with a baler. More specifically, the present disclosure relates to systems and methods in which a geographic location of a baled agricultural product is identified, followed by acquisition, storage, and development of information associated with the baled agricultural product.

SUMMARY

In one aspect, the disclosure provides a bale information system that includes a baling machine configured to process a material into a bale. The baling machine includes a sensor configured to send a signal in response to a release of the bale from the baling machine. A global positioning system receiver is in operable communication with the baling machine. A data storage system is operable to receive and store data regarding at least one of the position of the baling machine or the bale from the global positioning system receiver. A processing system is configured to assign a graphical bale identifier based at least in part on data from the global positioning system receiver and on the signal.

In another aspect, the disclosure provides an information system for a baling machine that includes a global positioning system receiver configured to track the global position of the baling machine and one or more bales discharged from the baling machine. A bale release sensor is coupled to the baling machine, the bale release sensor is configured to generate a signal in response to the release of the one or more bales discharged from the baling machine. A data storage system is operable to receive and store data from the global positioning system receiver relating to at least one of the position of the baling machine or the bale. A processing system is in operable communication with the data storage system and configured to assign a graphical bale identifier based at least in part on data from the global positioning system receiver and on the signal. A remote device is in communication with the data storage system and operable to display at least the graphical bale identifier.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of the formation and arrangement of components set forth in the following description or illustrated in the accompanying drawings. The disclosure is capable of supporting other embodiments and of being practiced or of being carried out in various ways.

The term calculating (or calculate and calculated), as used herein is used with reference to calculations performed by the disclosed system. The term includes calculating, determining, and estimating.

Also, various embodiments of the systems and methods herein are disclosed as being applied on or used in conjunction with a baling machine or a baler. As used herein and in the appended claims, the terms "baling machine" or "baler" encompass any equipment, machine, or device that is adapted to compress a cut and/or a raked crop into a bale. For example, the detailed disclosure herein illustrates an example of an extrusion type baler that produces a rectangular shaped bale. This baler is shown for purposes of illustration, as the systems and methods can be incorporated into any suitable baler. For example, the baler can include, but is not limited to, an extrusion type baler or a non-extrusion type baler. In addition, the baler can produce a rectangular shaped bale, a cylindrical shaped bale, or any other suitable shape or size of bale. In yet other embodiments, the disclosure may relate to other types of machines (e.g., vehicles, tractors, harvesters, other types of agricultural machines, forestry machines, mining machines, construction machines, machines for manufacturing, etc.).

In addition, various embodiments of the systems and methods herein are disclosed as being applied on or used in conjunction with agricultural material that is processed by the baler. Agricultural crop material can include, but is not limited to, hay, straw, silage, cotton, or any other suitable material that can be handled, transported, and/or stored in a bale form.

Figure 1:
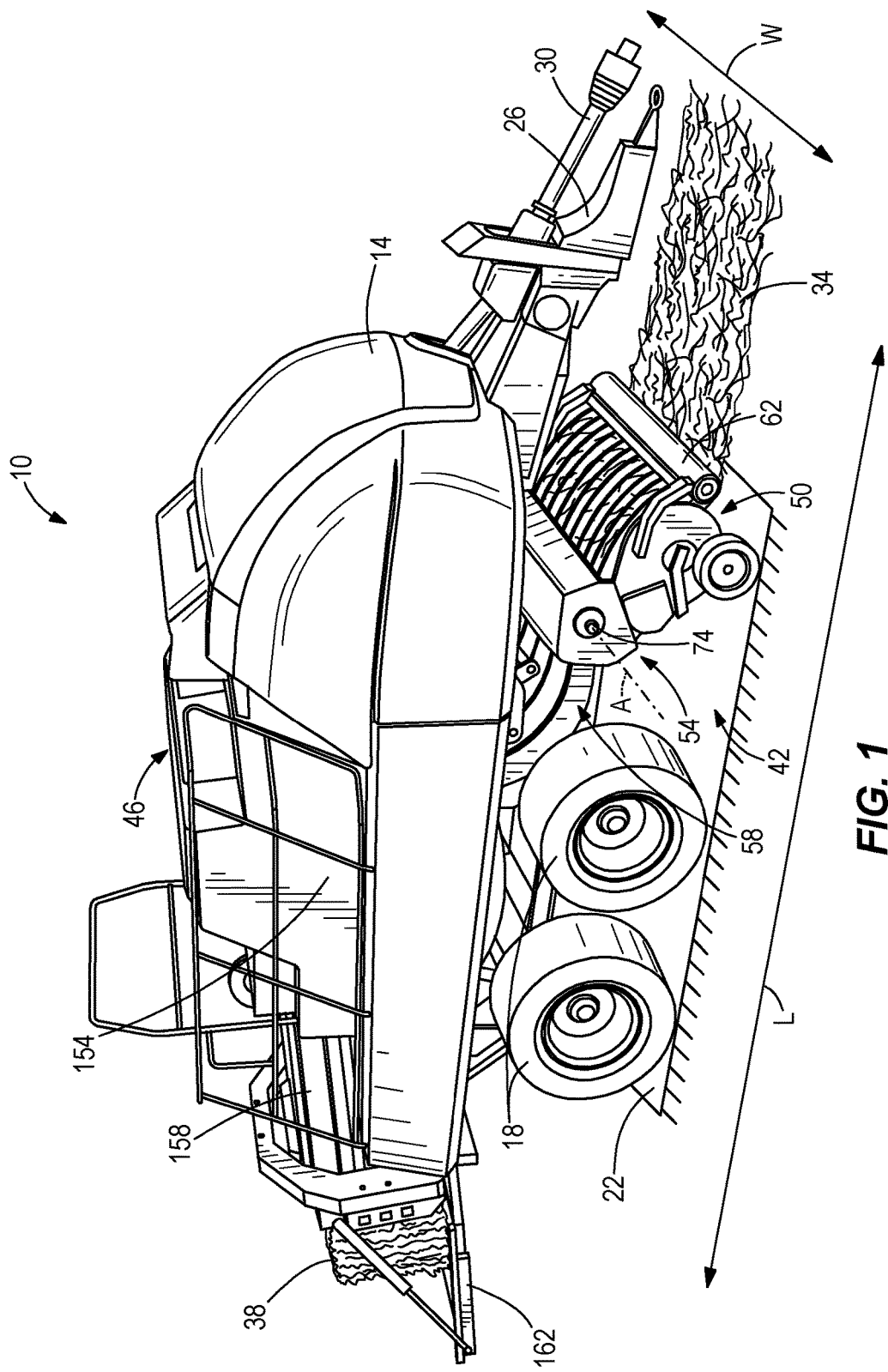
FIG. 1 is a perspective view of an embodiment of a baler.

FIG. 1 illustrates an embodiment of a baler 10. The baler 10 includes a frame 14 supported by a plurality of wheels 18 configured for travelling along a support surface 22, such as a field or road. The frame 14 defines a longitudinal direction L that extends generally in a direction of travel of the baler 10, and a width direction W that extends substantially perpendicular to the longitudinal direction L (and is substantially parallel with the support surface 22. A tow bar 26 is attached to the frame 14, extends generally in the longitudinal direction L, and is configured to be connected to a towing vehicle (not shown), such as an agricultural tractor or other suitable driven vehicle. The illustrated baler 10 also includes a power takeoff shaft 30 that is connectable to the towing vehicle to transmit a rotating drive force from the towing vehicle to various components of the baler 10, such as the components that collect an agricultural material 34 and the components that form a bale 38. In other implementations, the baler 10 can have a dedicated power supply and/or a prime mover (not shown), such as an engine, motor, battery, fuel cell, etc. The power supply and/or prime mover can be configured to drive the wheels 18, power one or more components of the baler 10, and/or drive one or more components of the baler 10. In addition, the baler 10 can include the necessary components to be driven instead of towed.

The baler 10 includes a feed system 42 that is configured to pick up agricultural material 34 from the support surface 22, and convey the material 34 to a compression system 46. The compression system 46 is configured to compress the material 34 (e.g., by way of a plunger, a belt, etc.) into a densely packed bale 38, such as a square bale 38 or a round bale (not shown), and then eject the bale 38 from the baler 10.

Figure 2:
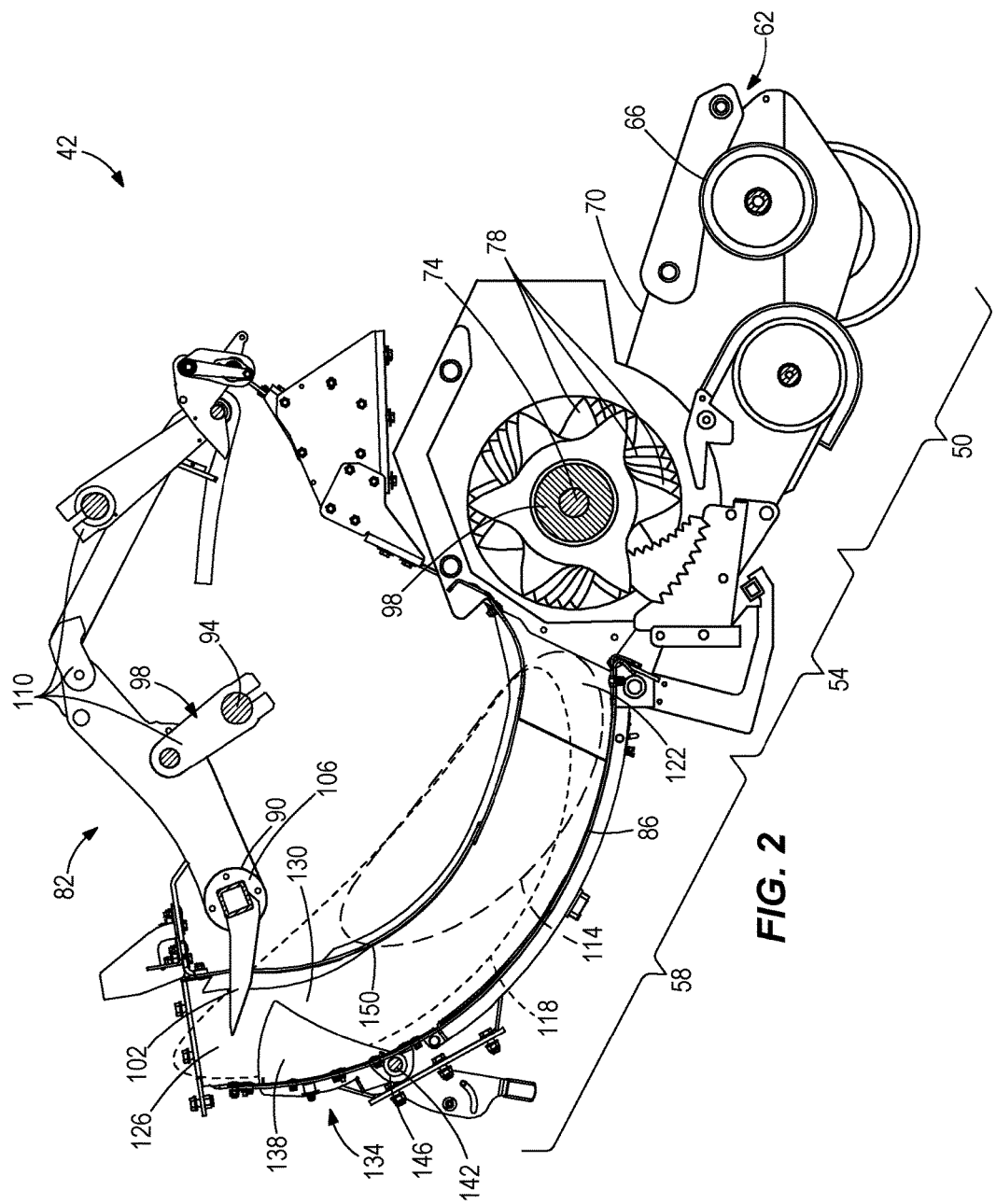
FIG. 2 is a partial side view of a feed system of the baler of FIG. 1.

Referring to FIGS. 1-2, the feed system 42 includes a pickup assembly 50, a cutter assembly 54, and a lifter assembly 58. More specifically, the pickup assembly 50 is in operable communication with the cutter assembly 54, and the cutter assembly 54 is in operable communication with the lifter assembly 58.

The pickup assembly 50 defines an inlet 62 that is configured to pick up and introduce the agricultural material 34 into the baler 10. The agricultural material 34 travels from the inlet 62 to a roller baffle 66 oriented generally in the width direction W. The roller baffle 62 transfers the agricultural material 34 from the inlet 62 to a pickup plate 70 disposed adjacent the roller baffle 62. The pickup plate 70 conveys the agricultural material 34 to the cutter assembly 54. The pickup plate 70 can include a continuous loop surface that is configured to convey the agricultural material 34, such as a moving conveyor or other suitable conveying apparatus.

The cutter assembly 54 includes an elongated cutter shaft 74 oriented generally in the width direction W and carrying a series of cutters or blades 78 configured to cut the agricultural material 34. The cutter assembly 54 rotates about a central axis A of the cutter shaft 74. The central axis A is oriented generally in the width direction W substantially parallel to the roller baffle 66. In other embodiments, the pickup assembly 50 and cutter assembly 54 can have different formations and/or orientations with respect to the baler 10 and with respect to each other. Once cut, the agricultural material 34 travels from the cutter assembly 54 to the lifter assembly 58.

The lifter assembly 58 is configured to cooperate with the pickup assembly 50 and/or the cutter assembly 54 to receive the agricultural material 34 from the cutter assembly 54 and then transfer the agricultural material 34 to the compression system 46 (see FIG. 1). With specific reference to FIG. 2, the lifter assembly 58 includes a loading fork 82 that is in operable communication with a feed pan 86. The loading fork 82 includes a fork member 90 that is coupled to a driving shaft 94 by a loading fork linkage 98. The fork member 90 generally includes a plurality of forks 102 that project from the fork member 90 towards the feed pan 86. The fork member 90 is rotatably coupled to the loading fork linkage 98 at a fork member joint 106. The loading fork linkage 98 includes a plurality of connected arms 110, at least one of which is connected to the fork member 90 and to the driving shaft 94. The driving shaft 94 is rotatable about a drive axis defined by the driving shaft 94 for driving the fork member 90 along a pack path 114 and a lift path 118.

The feed pan 86 includes a receiving or first end 122 and a supplying or second end 126. Between the receiving and supplying ends 122, 126, the feed pan 86 defines a pre-compression chamber 130. The feed pan 86 also includes a trip assembly 134 that is configured to transition the loading fork 82 between the pack path 114 and the lift path 118. The trip assembly 134 includes a plurality of trip plates 138 that pivot about an axis defined by a pivot member 142, making the trip plates 138 movably disposed in the pre-compression chamber 130. The trip plates 138 are also biased into the feed pan 86 by a biasing member 146. When biased into the feed pan 86 (as shown in FIG. 2), the trip plates 138 are positioned in a pack position or configuration. As agricultural material 34 accumulates in the feed pan 86, the agricultural material 34 will overcome the bias and pivot (or deflect) the trip plates 138 about the pivot member 142 away from the feed pan 86 to a lift position or configuration (not shown). In the lift configuration, the trip plates 138 are at least partially withdrawn from the pre-compression chamber 130. The trip assembly 134 is coupled to or in operable communication with the loading fork 82 to transition the loading fork 82 between the pack path 114 (when the trip assembly 134 is in the pack configuration) and the lift path 118 (when the trip assembly 134 is in the lift configuration). The trip assembly 134 can be mechanically or electrically coupled to the loading fork linkage 98 for moving the loading fork linkage 98 between the pack configuration and the lift configuration.

In operation, agricultural material 34 exits the cutter assembly 54, and enters into the receiving end 122 of the feed pan 86. While in the pack configuration, the loading fork 82 travels along the pack path 114, performing a pack stroke. The pack path 114 forms a first continuous loop where the loading fork 82 travels from the receiving end 122 towards the supplying end 126, exiting the feed pan 86 at an intermediate point 150 between the receiving and supplying ends 122, 126 to return to the receiving end 122 and begin the loop again. During the pack stroke, the loading fork 82 draws agricultural material 34 from the receiving end 122 and moves the material 34 towards the supplying end 126. As the loading fork 82 continues to cycle along the pack path 114, agricultural material 34 accumulates in the feed pan 86 until the agricultural material 34 compresses the trip plates 138 to the lift configuration. The trip assembly 134 then communicates with the loading fork 82 to transition to the lift path 118, performing a lift stroke. The lift path 118 forms a second continuous loop where the loading fork 82 travels from the receiving end 122, through the feed pan 86 towards the supplying end 126. The loading fork 82 exits the feed pan 86 at an exit point closer to the supplying end 126 (and closer to the compression system 46) than the intermediate point 150 of the pack path 114. The loading fork 82 then returns to the receiving end 122 to repeat the loop. During the lift stroke, the loading fork 82 transfers agricultural material 34 from the feed pan 86 out of the lifter assembly 58 (i.e., out of the supplying end 126) and into the compression system 46. The loading fork 82 continues with the lift stroke until sufficient agricultural material 34 is transferred out of the feed pan 86 to allow the trip plates 138 of the trip assembly 134 to rebound from the lift configuration to the pack configuration (i.e., sufficient agricultural material 34 is removed from the feed pan 86 such that the agricultural material 34 no longer overcomes the bias imparted on the trip plates 138 by the biasing member 146). Once the trip assembly 134 transitions back to the pack configuration, the trip assembly 134 communicates with the loading fork 82 to transition back to the pack path 114 to perform the pack stroke. While the illustrated embodiment depicts the lift path 118 as larger (or longer) than the pack path 114, in other embodiments the paths 114, 118 can be any suitable length to draw agricultural material 34 into the feed pan 86, and subsequently transfer the agricultural material 34 out of the feed pan 86 and into the compression system 46.

Additional examples and implementations of the pickup assembly 50, the cutter assembly 54, and/or the lifter assembly 58 are included in commonly owned U.S. patent application Ser. Nos. 14/855,153 and 14/855,164, the contents of each of which are hereby incorporated herein by reference in their entirety. In other embodiments, the feed system 42 can include other structures, configurations, and/or components, such as those known in other types of balers (e.g., round balers, etc.).

The compression system 46 includes a plunger (not shown) for compressing the agricultural material 34, a bale chamber 154 for receiving and shaping the compressed agricultural material 34, and a bale case or extruder 158 for compressing and dispensing/extruding the compressed agricultural material 34 in the form of the bale 38. The bale chamber 154 is disposed adjacent the supplying end 126 of the feed pan 86, and is configured to receive a load of agricultural material 34 (also known as a flake) from the pre-compression chamber 130. Generally, in the pack path 114, the loading fork 82 packs the agricultural material 34 in the pre-compression chamber 130, and in the lift path 118 the loading fork 82 lifts the agricultural material 34 from the pre-compression chamber 130 into the bale chamber 154. The plunger (not shown) can be configured for reciprocating motion in the bale chamber 154 to compact and compress the agricultural material 34 in the bale chamber 154 on each lift stroke of the loading fork 82. In the illustrated embodiment, the bale chamber 154 has a rectangular cross-section for forming square or rectangular bales. However, in other embodiments the bale chamber 154 can have other suitable cross-sectional shapes and/or configurations. As the bale 38 forms, the bale 38 is packed from the bale chamber 154 into the bale case 158, where the bale 38 is extruded. As the bale 38 exits the bale case 158, the bale 38 travels onto a chute 162 before being discharged from the baler 10. A knotter assembly (not shown) can be positioned between the bale chamber 154 and the bale case 158 to dispense, wrap, cut, and tie twine (or other material) around the bale 38 in response to a bale length sensor (not shown) signaling that a predetermined bale length has been achieved.

Figure 3:
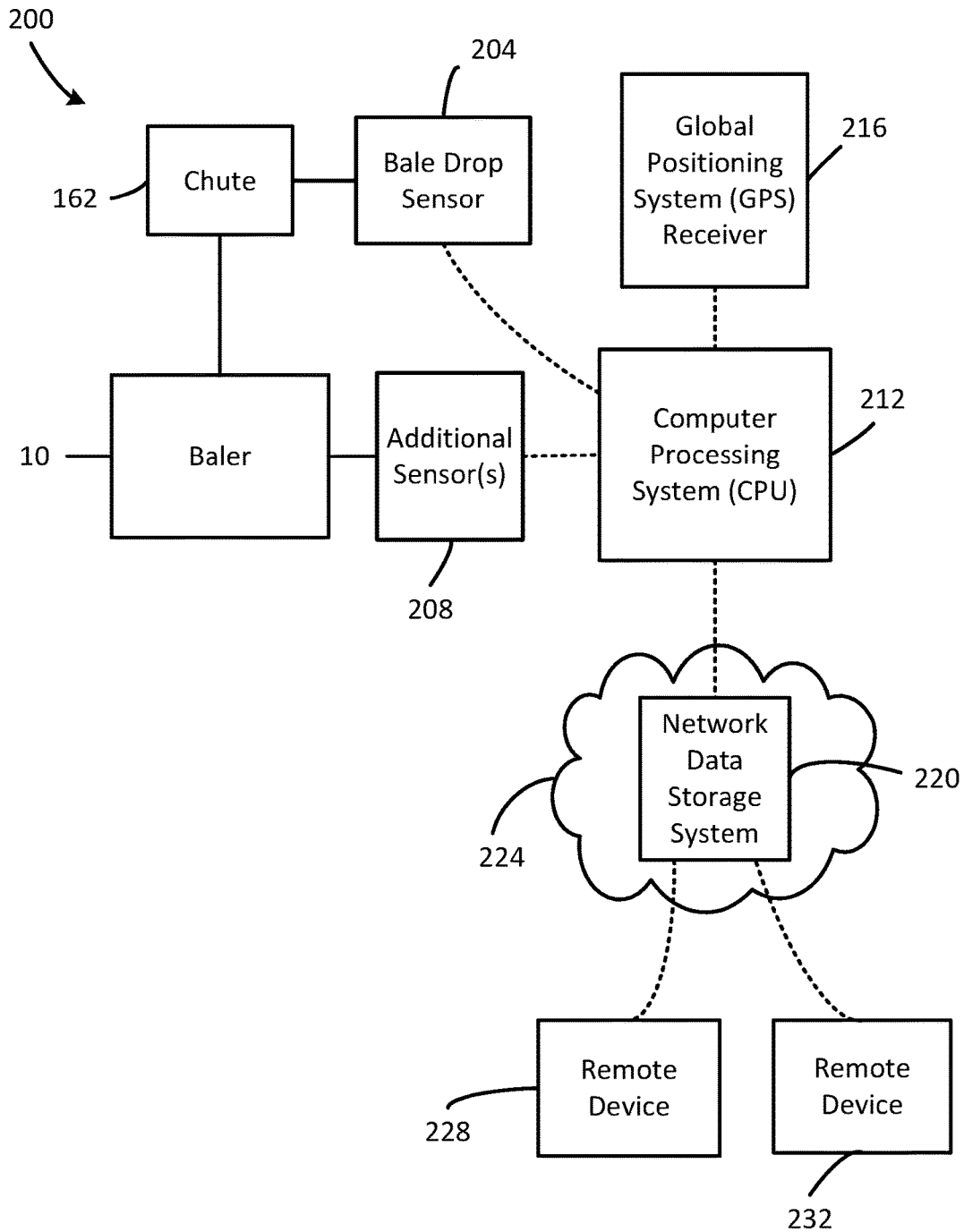
FIG. 3 is a schematic layout of the baler of FIG. 1 illustrating sensor positioning for acquiring data during operation.

FIG. 3 illustrates a schematic view of an embodiment of a sensor arrangement or system 200 for the baler 10. The sensor arrangement 200 provides sensor data (or other information) associated with the baler 10 and/or one or more bales 38. The sensor data is utilized by a bale information system 300 (FIG. 4) to determine a geographic location of each bale 38 and/or information association with each bale 38.

Referring to FIG. 3, a first sensor 204 is coupled to or positioned on a portion of the baler 10. In the illustrated embodiment, the sensor 204 is a bale drop sensor 204 coupled to the chute 162. The bale drop sensor 204 detects when a bale 38 is dropped from the baler 10 (i.e., off the chute 162). The bale drop sensor 204 can be a proximity sensor that detects when the bale 38 is dropped or otherwise released from the baler 10. In other embodiments, the bale drop sensor 204 can be an ultrasonic sensor (or other suitable sensor) that detects when the bale 38 is dropped or otherwise released from the baler 10. In still other embodiments, the bale drop sensor 204 can measure an amount of deflection in the chute 162 to detect when a bale 38 has been dropped or otherwise released from the baler 10. For example, as the baler 10 prepares to release the bale 38, the weight of the bale 38 creates a deflection in the chute 162. When the bale 38 is released, the chute 162 overcomes the deflection (or the deflection is removed or the chute 162 springs back). The bale drop sensor 204 can measure this deflection to identify the release of the bale 38. In addition, the bale drop sensor 204 can include a filter or algorithm to determine the difference in chute 162 deflection caused by the release of the bale 38 (i.e., a large deflection) and chute 162 vibration caused by the baler 10 traversing an uneven support surface 22. By filtering out vibration, the bale drop sensor 204 more accurately detects a bale 38 release, and attempts to avoid generation of a false release or false drop caused by operational vibration.

One or more additional sensors 208 can also be coupled to or positioned on a portion of the baler 10. For example, the baler 10 can include a moisture sensor that detects a moisture content of the agricultural material 34. In addition, or alternatively, the baler 10 can include a weight sensor. The weight sensor can detect a weight of the bale 38 at (or near) release, or a weight of the agricultural material 34 processed by the baler 10. In addition, or alternatively, the baler 10 can include one or more sensors for detecting or otherwise calculating crop yield (or agricultural output). The sensors can include one or more load sensors positioned on a portion of the compression system 46, cutter assembly 54, loading fork 82, and/or pre-compression chamber 130, and which measure instantaneous load applied to the component(s) by the agricultural material 34. The measured load can be manipulated or calculated to determine a value corresponding with agricultural material mass through the baler 10 (e.g., mass flow through the compression system 46, mass flow through the pickup assembly 50, mass flow through the cutter assembly 54, and/or mass flow through the feed pan 86, etc.). In other embodiments, sensors can measure bale length, bale weight, twine use, twine length per bale 38, and/or any other suitable or desired attribute. In yet other embodiments, any number of additional sensors 208 (or plurality of sensors 208) can be positioned on any portion(s) or component(s) of the baler 10 to detect or gather information relating to the baler 10, operation of the baler 10, and/or the agricultural material 34 processed by the baler 10.

Each sensor 204 or the plurality of sensors 204, 208 (depending on the embodiment of baler 10) can be in communication with a computer processing system or controller 212, as illustrated in FIG. 3 by broken lines. The communication can be wired, wireless, or any suitable system for communication (e.g., radio, cellular, BLUETOOTH, etc.). In the illustrated embodiment, the computer processing system 212 is a handheld or wireless device, such as a smart phone, tablet computer, laptop computer, or other mobile device that is remote from the baler 10 (e.g., not physically attached to the baler 10). In other embodiments, the computer processing system 212 can be a dedicated system positioned on the baler 10, a towing vehicle (not shown) that tows the baler 10, or any other suitable computing or processing device.

A Global Positioning System (GPS) receiver 216 is in communication with the computer processing system 212, as illustrated in FIG. 3 by broken lines. The GPS receiver 216 can be embedded in the computer processing system 212, or can be separate from the computer processing system 212 (e.g., positioned on the baler 10, on a towing vehicle (not shown) that tows the baler 10, etc.). Accordingly, the communication can be wired, wireless, or any suitable system for communication (e.g., radio, cellular, BLUETOOTH, etc.).

The computer processing system 212 can also be in communication with a data storage or server, or second computer processing system 220 through the Internet or local area network or a cloud computing arrangement 224, as illustrated in FIG. 3 by broken lines. The communication can be any suitable wired or wireless system for communication (e.g., radio, cellular, BLUETOOTH, 802.11 Wireless Networking protocol, etc.).

The computer processing system 212 can also be in communication with a bale information system or application 300 (FIG. 4), which is discussed in additional detail below. The bale information system 300 can be locally distributed (e.g., stored, reside in, and/or operated on the computer processing system 212) or distributed through the Internet or local area network 224 (e.g., stored on the data storage system 220).

Not only does the computer processing system 212 communicate with the data storage system 220, but one or more additional devices or remote devices 228, 232 can also communicate with the data storage system 220, as also illustrated in FIG. 3 by broken lines. The communication can be any suitable wired or wireless system for communication (e.g., radio, cellular, BLUETOOTH, 802.11 Wireless Networking protocol, etc.). The additional devices 228, 232 (or plurality of devices 228, 232) can be substantially similar to the computer processing system 212 (e.g., can be a smart phone, tablet computer, laptop computer, or other mobile device), or can be a remote device (e.g., a desktop computer, server system, etc.). The additional devices 228, 232 can access data that is stored in one or more of the computer processing system 212 and/or data storage system 220 and that is associated with the bale information system 300. As such, the one or more additional devices 228, 232 can include or interface with the bale information system 300.

Figure 4:
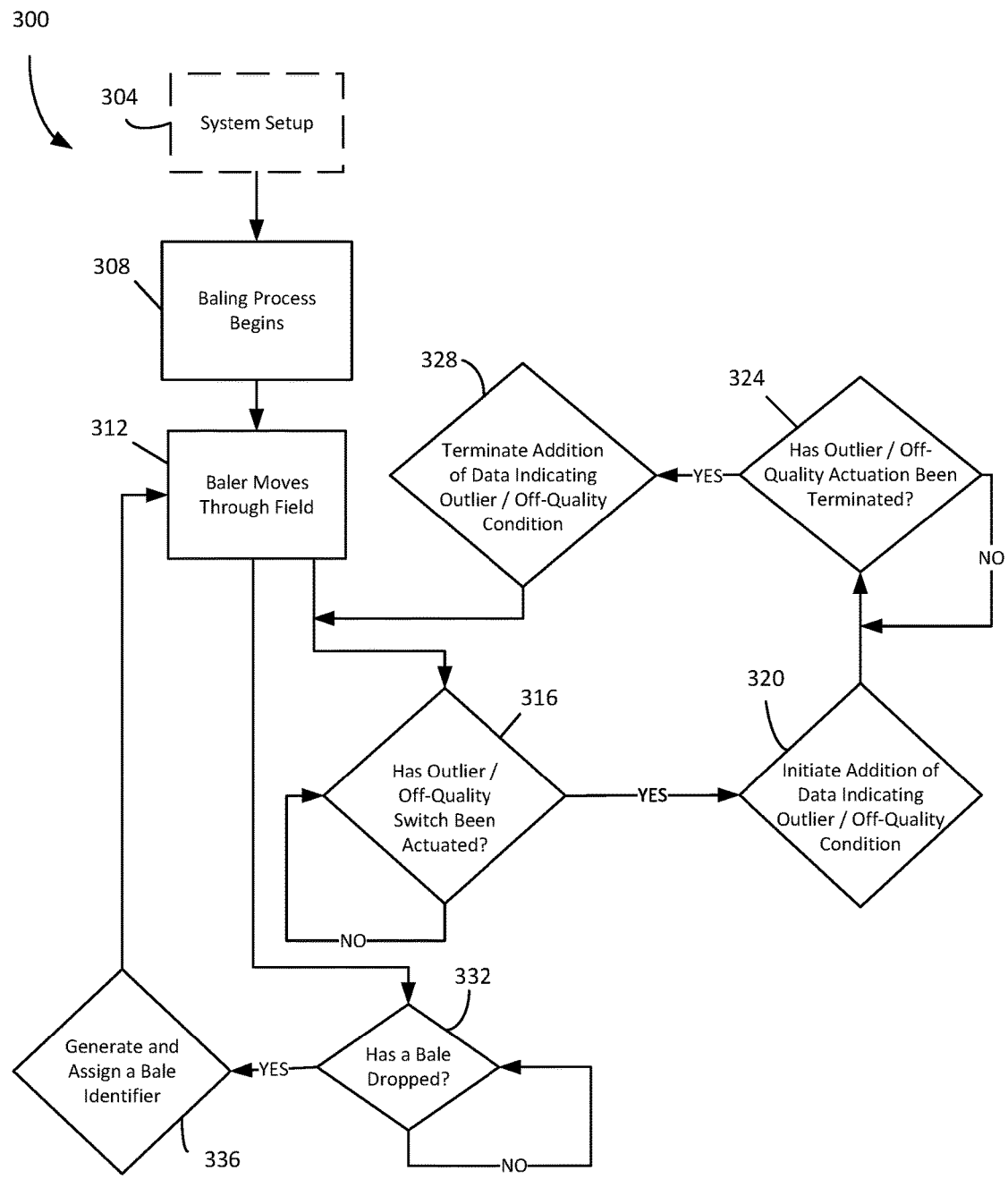
FIG. 4 is a flow diagram of an embodiment of a bale information system.

FIG. 4 illustrates an example of the bale information system or application 300 that uses information acquired from the baler 10 determine a geographic location of each bale 38 and/or information association with each bale 38. That information can then be used to ascertain or calculate additional information regarding the agricultural material 34 processed by the baler 10. The system 300 can also share the information with one or more additional devices (e.g., device 212, device 228, device 232, etc.) and/or present the information through a graphical interface. Accurate bale geographic location information can assist with bale inventory and location identification. Information associated with the agricultural material 34 that defines the bale 38 can assist with identifying bale quality, along with various properties of the bale 38 and/or the associated agricultural material 34 (e.g., bale weight, bale moisture content, bale length, etc.).

The bale information system 300 can be a module that is distributed (i.e., operates on a remote server or from a remote location) and is in communication with one or more devices 212, 228, 232. The communication can be through any suitable wired or wireless connection, a web portal, a web site, a local area network, generally over the Internet, etc. In other embodiments, the system 300 can be an application or module that operates in a local environment. For example, the system 300 can be a module that operates on (or is associated with) the baler 10 and/or any other device or equipment in the vicinity of and in communication with the baler 10 (e.g., a laptop computer, smartphone, etc.). The bale information system 300 includes a series of processing instructions or steps that are depicted in flow diagram form.

Referring to FIG. 4, an exemplary baling process can include a system setup at step 304. For example, the process can obtain or retrieve and input information associated with the baling process (e.g., field identifier, weather conditions, date, etc.). Further, the GPS receiver 216 may need orientation to accurately track a location of one or more bales 38. In some embodiments of a baler 10, the GPS receiver 216 may not be attached to the baler 10 or the towing vehicle. Accordingly, the GPS receiver 216 may require orientation with regard to the distance between the GPS receiver 216 and the chute 162 of the baler 10. The orientation can be manual (e.g., an operator enters a distance from the chute 162 to the location of the GPS receiver 216), preset and selectable by a user (e.g., a standard distance from the chute 162 of one or more balers 10 to a cab of one or more towing vehicles, which may be selectable by a user based on a model number, design, or other identifying information of the baler 10 and/or towing vehicle), and/or automatic (e.g., an algorithm may calculate the location of the chute 162 and/or bales 38 discharged from the chute 162 based on data from the GPS receiver 216).

The baling process begins at step 308 with the baler 10 initiating operation, the GPS receiver 216 transmitting GPS location data (or GPS coordinates), and the one or more sensors 204, 208 transmitting sensor data. The GPS location data and the sensor data can be transmitted to and stored by the data storage system 220 (either through the computer processing system 212 or directly to the data storage system 220). In various embodiments, transmission of the GPS location and sensor data can be interlocked with an operational aspect of the baler 10 (e.g., one or more components of the feed system 42 and/or compression system 46, etc.) to transmit and collect data during baler operation and not during all movements of the baler 10 (e.g., repositioning of the baler 10, etc.). In addition, in other embodiments the application 300 can include a button or trigger that is operable by a user to initiate operation of the application 300 (e.g., a "begin" or "start" button that is accessible to the user through a user interface, such as a user interface accessible through the computer processing system 212).

Next at step 312, the baler 10 begins to traverse or move through an area (e.g., an agricultural field, etc.). As the baler 10 moves in the illustrated embodiment, GPS data and sensor data continue to be transmitted to and stored by the data storage system 220. The GPS data and associated sensor data can be stored in a chronological order (e.g., first in first out, or FIFO). In other embodiments, the GPS data and/or associated sensor data can also include or be assigned a date identifier, a time identifier, and/or any other suitable identifier for sequencing the data (e.g., a time stamp, etc.).

A button, switch, or other user-actuatable control can allow a user to signal or generate data indicating that the agricultural material 34 entering the baler 10 is an outlier, off-quality, discontinuous, or not representative of a desired agricultural material 34. For example, as the baler 10 is traversing the area, the operator or user may visually inspect or observe an area of undesirable quality agricultural material 34 (e.g., high weed content, etc.). The operator or user can actuate the switch, which can be provided through a user interface such as the user interface accessible through the computer processing system 212. Actuation of the switch can be by depressing the switch as long as the undesirable quality material is observed, or by separately actuating the switch "on" and "off." When the switch is actuated, the process sends additional data to the data storage system 220 that accompanies the GPS data and sensor data, indicating an outlier or off-quality condition. The user interface can also allow the operator or user to identify the off-quality condition for future reference. At step 316 in the illustrated embodiment, the system detects whether the switch has been actuated. If yes, the system proceeds to step 320 where the additional data indicating an outlier or off-quality condition is transmitted to the data storage system 220. Next, at step 324, the system detects whether the actuation of the switch has been terminated. If it has not, the process continues to detect for actuation of the switch indicating termination (e.g., repeats step 324). If the process detects that the switch has been actuated indicating termination, the process terminates generation of the additional data at step 328, and returns to step 316. Returning back to step 316, if the system determines that the system does not detect that the switch has been actuated, the process continues to detect for actuation of the switch indicating an outlier or off-quality condition (e.g., repeats step 316).

While the illustrated process detects for outlier or off quality conditions, the process can concurrently detect for completion and release of each bale 38. At step 332 the system detects whether the bale drop sensor 204 signals a bale drop. If it does not detect a bale drop, the process returns to step 332 and continues to detect for a bale drop (e.g., repeats step 332). If it does detect a bale drop, the process proceeds to step 336.

At step 336, the process generates and assigns a bale identifier. The bale identifier is a unique electronic identification or electronic tag, geotag, or virtual tag that identifies the bale. The process also captures the GPS data at (or approximate to) the bale drop, and communicates the bale identifier and GPS data to the computer processing system 212. The process then returns to step 312 and repeats until the baling process is complete (e.g., the baler 10 or a component thereof is powered down or is otherwise stopped, etc.).

Once the data has been uploaded to the computer processing system 212, one or more devices 212, 228, 232 can access the data, and further conduct calculations using the data. For example, the calculations can include moving averages or averages for a predetermined (or preselected) range of data points. These averages or moving averages can be applied to moisture or moisture levels, and yield. Other calculations can include, but are not limited to, mass flow, weight of each bale 38, length of each bale 38, location of each bale 38, the directionality or orientation of each bale 38, twine usage, twine per bale, and/or bale quality (e.g., based on outlier or off-quality indications, indications from steps 316 to 328 of the system 300, assigning quality tiers based on certain criteria, etc.). In addition, the data (e.g., raw or results of calculations) can be used to assign and/or sort one or more bales 38 by quality criteria (e.g., moisture content, rejects, etc.), or sort by bale identifiers, other data, or results of calculations from the data. Further, the data can be used to calibrate or recalibrate weight measurement of the baler 10. For example, the mass flow can be used to calculate bale weight. When each bale 38 is retrieved from a field by a retrieval vehicle (e.g., by a fork truck, forklift, etc.), the retrieval vehicle can include a scale or other weight measurement device to physically weigh each bale 38 (or acquire an actual weight). That actual weight can be associated with the bale identifier, and then uploaded to and/or stored by the data storage system 220. Later, the actual weight and calculated weight can be compared and/or the difference used to recalibrate the weight sensor and/or ascertain discrepancies or offsets in the weight calculation made by the baler 10.

Figure 5:
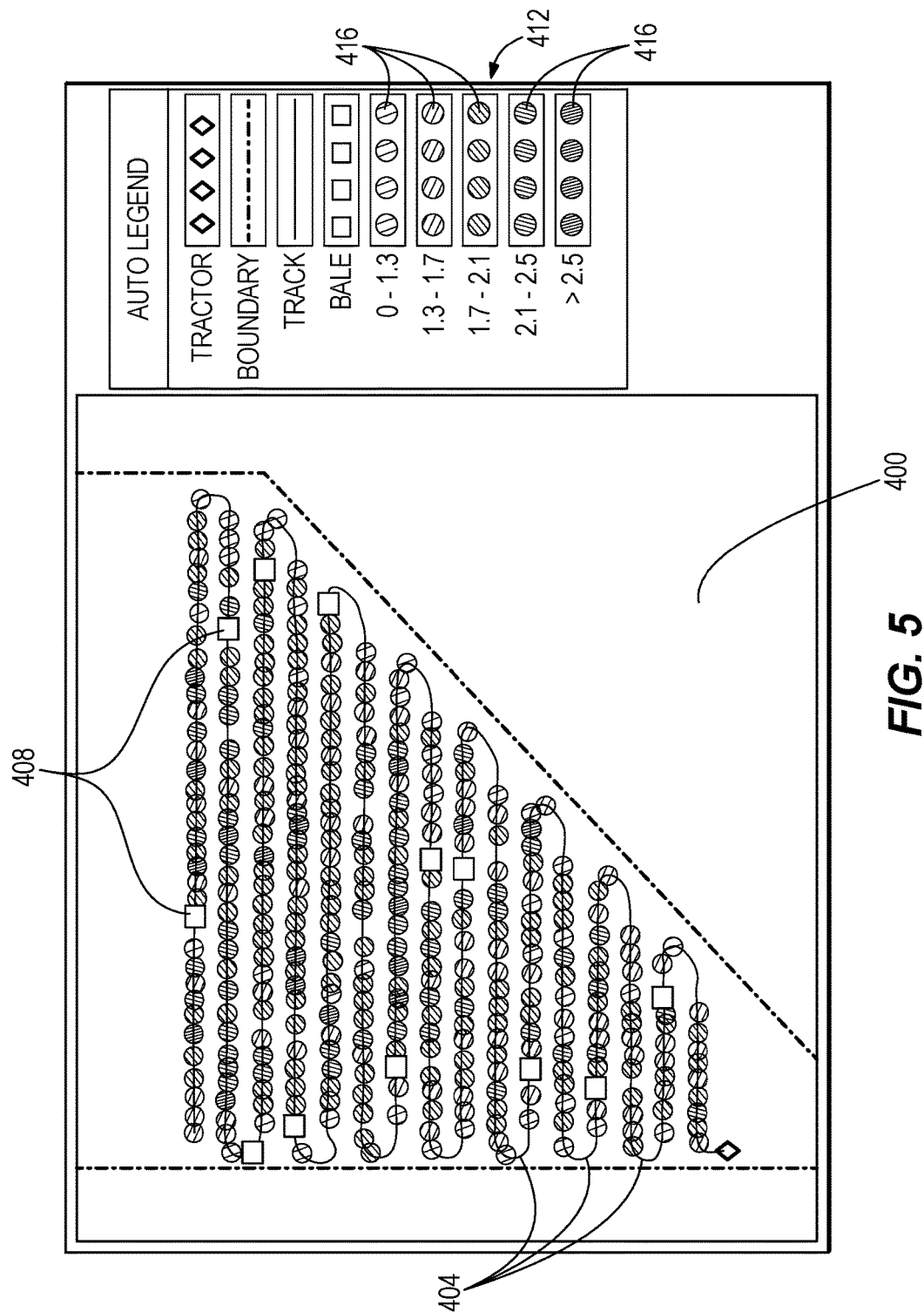
FIG. 5 is a first graphical representation of data acquired by the system of FIG. 4 during operation of the baler.
Figure 6:
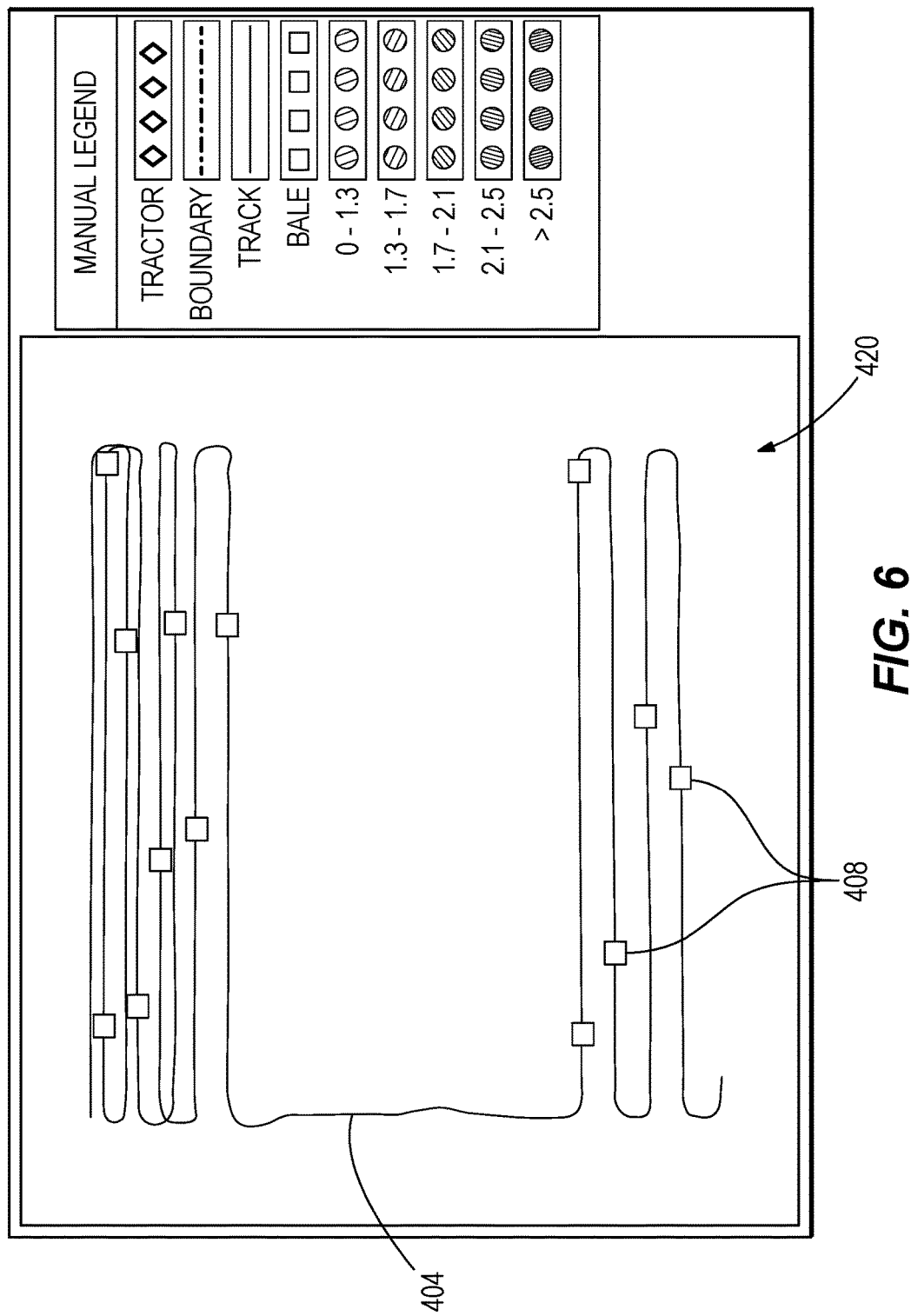
FIG. 6 is a second graphical representation of data acquired by the system of FIG. 4 during operation of the baler.

The actual data and/or calculated bale data can then be graphically depicted. For example, the user interface of the system 300 can graphically present certain data. More specifically, the one or more calculations can be performed on the data, with the results of those calculations, the raw data, and/or the GPS data being depicted in a graphical form. As illustrated in FIG. 5 by way of example, a first graphical representation of the data 400 utilizes the GPS data to generate a baler path 404. The baler path 404 is a virtual path generated by the chronological arrangement (or consecutive arrangement) of GPS data. Along the path, each bale 38 dropped by the baler 10 is illustrated as a virtual bale 408. The GPS data associated with each bale 38 is used to indicate the position of each virtual bale 408 along the path 404. In other examples of embodiments, the baler path 404 and associated virtual bales 408 can be overlaid on a digital map of an area associated with the baler path 404 (e.g., a map of the field through which the path 404 occurs, etc.). Calculations on certain data generate yield data for the agricultural material 34 at certain intervals along the path 404. The yield data can be separated into a series of yield ranges 412, with each range having a separate indicia 416 (e.g., shape, color, size, etc.) to differentiate each yield range 412. The appropriate indicia 416 are depicted along the path 404 to illustrate yield. FIG. 6 illustrates, by way of example, a second graphical representation of the data 420 that depicts only the path 404 of the baler 10 and the positions of each virtual bale 408 along the path 404.

Figure 7:
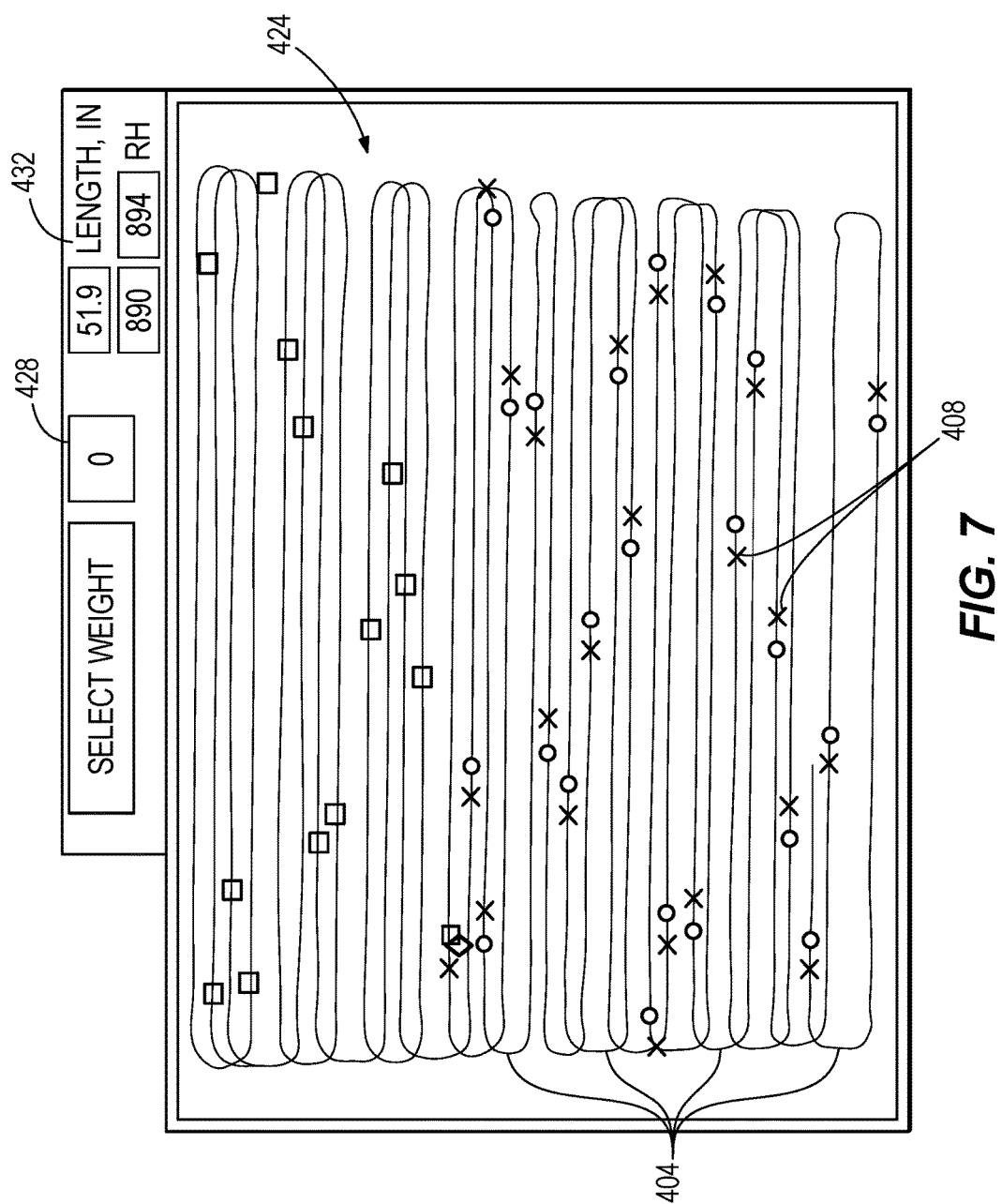
FIG. 7 is a third graphical representation of data acquired by the system of FIG. 4 during operation of the baler.

FIG. 7 illustrates, by way of example, a third graphical representation of the data 424 that depicts the location of each virtual bale 408 along the path 404. In addition, the calculated weight 428 of each bale 38 and calculated measurements 432 for each bale 38 (e.g., length, etc.) are depicted. In other embodiments, other data or results of calculations can be depicted in a graphical format. It should be appreciated that the calculations and/or graphical depictions can be conducted at the data storage system 220, with the results being distributed to one or more devices 212, 228, 232, or each device can locally perform calculations and/or graphical depictions from data acquired from the data storage system 220.

Various features and advantages of the disclosure are set forth herein.

What is claimed is:

1. A bale information system comprising:
    a baling machine configured to process a material into a bale, the baling machine including a sensor configured to send a signal in response to a release of the bale from the baling machine;
    a global positioning system receiver in operable communication with the baling machine;
    a data storage system operable to receive and store data regarding at least one of a position of the baling machine or the bale from the global positioning system receiver; and
    a processing system configured to assign a graphical bale identifier based at least in part on data from the global positioning system receiver and on the signal,
    wherein the data storage system is operable to receive a user signal indicative of material that is discontinuous with a desired material.

2. The bale information system of claim 1, wherein the baling machine includes a second sensor, the second sensor configured to measure one of a moisture, a mass flow, or a yield of the material processed by the baling machine.

3. The bale information system of claim 2, wherein the data storage system is operable to receive and store data from the second sensor.

4. The bale information system of claim 1, wherein the data storage system is operable to store data from the global positioning system receiver in a chronological order.

5. The bale information system of claim 1, further comprising:

a remote device configured to communicate with the data storage system and access data stored by the data storage system.

6. The bale information system of claim 5, wherein the remote device includes an interface to view the data.

7. The bale information system of claim 5, wherein the remote device includes a graphical interface configured to illustrate one or more aspects of the data.

8. The bale information system of claim 7, wherein the graphical interface is configured to graphically depict the bale position based at least in part on data from the global positioning system receiver.

9. The bale information system of claim 7, wherein the graphical interface is configured to graphically depict a bale orientation based at least in part on data from the global positioning system receiver.

10. The bale information system of claim 7, wherein the graphical interface is configured to graphically depict a baling machine travel path based at least in part on data from the global positioning system receiver.

11. The bale information system of claim 10, wherein the graphical interface is configured to graphically depict the baling machine travel path over a virtual map of an area associated with the travel path.

12. The bale information system of claim 1, wherein the material is an agricultural material.

13. The bale information system of claim 1, wherein the material is hay.

14. An information system for a baling machine, the information system comprising:
- a global positioning system receiver configured to track a global position of the baling machine and at least one bales discharged from the baling machine;
- a bale release sensor coupled to the baling machine, the bale release sensor configured to generate a signal in response to the release of the at least one bales discharged from the baling machine;
- a data storage system operable to receive and store data from the global positioning system receiver relating to at least one of the position of the baling machine or the at least one bale and operable to receive and store a user signal indicative of material that is not representative of a desired agricultural material;
- a processing system in operable communication with the data storage system and configured to assign a graphical bale identifier based at least in part on data from the global positioning system receiver and on the signal; and
- a remote device in communication with the data storage system and operable to display at least the graphical bale identifier.

15. The information system of claim 14, wherein the remote device is configured to transform the data into a graphical depiction that illustrates at least a baling machine travel path and the position of the at least one bale based at least in part on data from the global positioning system receiver.

16. The information system of claim 14, wherein the remote device includes a plurality of remote devices, each of the plurality of remote devices in communication with the data storage system and operable to access data stored by the data storage system.

17. The information system of claim 14, wherein the system is configured to assign a unique bale identifier in response to the signal indicating the release of the at least one bale generated by the bale release sensor, the bale identifier being stored by the data storage system.

18. The information system of claim 17, wherein the data storage system is configured to acquire the global position of the at least one bale in response to the signal generated by the bale release sensor indicating the release of the bale.

* * * * *